United States Patent [19]
Graf

[11] 3,753,063
[45] Aug. 14, 1973

[54] STABILIZING MEANS FOR AN A-C MOTOR DRIVE
[75] Inventor: Carlton Eugene Graf, Erie, Pa.
[73] Assignee: General Electric Company, Erie, Pa.
[22] Filed: June 13, 1972
[21] Appl. No.: 262,270

[52] U.S. Cl..................... 318/227, 318/345, 321/18
[51] Int. Cl. .............................................. H02p 5/16
[58] Field of Search.................... 318/227, 332, 331, 318/345; 321/2, 16, 18

[56] References Cited
UNITED STATES PATENTS
3,593,103  7/1971  Chandler ................................ 321/2
3,697,844  10/1972  Dinger ................................ 318/331

Primary Examiner—Bernard A. Gilheany
Assistant Examiner—Thomas Langer
Attorney—Harold H. Green et al.

[57] ABSTRACT

An a-c adjustable speed motor drive system including an a-c motor and power conversion means for converting d-c electric power to adjustable frequency, adjustable voltage electric power for delivery to the motor is provided with stabilizing means for damping motor speed oscillations. The stabilizing means includes apparatus for generating a first signal having oscillations therein related to oscillations in the d-c voltage of the electric power supplied to the power conversion means and means responsive to the first signal for generating a stabilizing signal phase shifted with respect to the first signal. The stabilizing signal is supplied to and utilized by the control apparatus for the power conversion means as a control signal to adjust the power output, preferably the output voltage, of the power conversion means. The stabilizing signal generator means includes a phase shifting network for phase shifting the stabilizing signal relative to the first signal by an amount sufficient to cause oscillations in the output voltage to occur substantially in-phase with oscillations in the motor speed.

6 Claims, 4 Drawing Figures

STABILIZING MEANS FOR AN A-C MOTOR DRIVE

BACKGROUND OF THE INVENTION

1. Field of the Invention

This invention relates to a-c adjustable speed motor drive systems of the type including d-c to a-c power conversion equipment and, more particularly, to the sensing and utilization of variations in the d-c voltage for drive system stabilization.

2. Description of the Prior Art

It is well known that a-c motors, such as induction motors, synchronous motors, and reluctance-synchronous motors, are often unstable when operated at a particular frequency or range of frequencies with a particular load inertia. This tendency of a-c motors to oscillate about a steady state speed is most pronounced when operating at relatively low frequencies. In the past, a-c motors have been used largely in constant speed drive systems in which the motor is supplied with a-c electric power of a fixed frequency, the motor being designed for stable operation at that fixed frequency. For various reasons, however, adjustable speed drive systems using a-c motors are gaining acceptance, the motor being supplied with adjustable frequency and adjustable voltage power from suitable power conversion equipment such as an inverter or a cyclo-converter. In an a-c adjustable speed motor drive system, the motor should be capable of operating throughout an extremely broad frequency range and under a wide range of load conditions. Difficulties have been encountered heretofore, however, in that the desired ranges of speed and load conditions often include operating conditions under which the a-c motor is basically unstable. It is therefore highly desirable that means be provided for ensuring stable operation of a-c motor drives throughout broad speed and load ranges. More specifically, it is desirable that effective stabilization means be provided for variable frequency a-c drive systems utilizing pulse width modulated inverters of the type disclosed and claimed by copending patent application Ser. No. 81,758 entitled "Adjustable Speed Polyphase A-C Motor Drive," filed on Oct. 19, 1970, in the names of Carlton E. Graf and Werner K. Volkmann, assigned to the assignee of this invention. While the present invention will be described herein in connection with a drive system of the type taught by the aforesaid patent application to the extent necessary for a full and complete understanding of the invention, a more complete understanding of such inverter circuits may be obtained from the aforesaid patent application.

SUMMARY OF THE INVENTION

Accordingly, it is a primary object of this invention to provide improved means for stabilizing operation of a-c motors utilized in a-c adjustable speed motor drive systems.

Another object is to provide improved means for permitting stable operation of a-c motor drives throughout a broad range of speed and load conditions.

Yet another object is to provide means for stabilizing drive systems in which d-c electric power is changed by an inverter to adjustable frequency, adjustable voltage electric power for delivery to an a-c motor or motors.

A still further object of this invention is to provide improved means for stabilizing inverter drive systems of the type disclosed by the aforesaid patent application Ser. No. 81,758.

Briefly stated, in carrying out the invention in one form, stabilizing means for damping motor speed oscillations, generally about a steady state motor speed, are provided for an a-c adjustable speed motor drive system which includes power conversion means for changing d-c electric power supplied to a pair of input terminals to adjustable frequency, adjustable voltage a-c electric power, an a-c motor coupled to the output of the power conversion means for receiving electric power therefrom, and control apparatus including frequency and voltage control means for controlling the frequency and voltage of the a-c power supplied to the motor. The drive system also includes capacitive means connected between the input terminals of the d-c to a-c power conversion means. The stabilizing means of the invention includes first means coupled to the capacitive means and responsive to oscillations in the charge thereon to generate a first signal having oscillations therein related to the oscillations in the charge on the capacitive means. Second means is coupled to the first means for receiving the first signal therefrom, the second means being responsive to the first signal to generate a stabilizing signal phase shifted relative to the first signal. A stabilizing signal is supplied to the control apparatus by third means as an input signal for controlling the power output to the a-c motor. By further aspects of the invention, the third means is coupled to the voltage control means of the control apparatus, and the stabilizing signal is phase shifted relative to the first signal by an amount sufficient to cause oscillations in the output voltage to occur approximately in-phase with motor speed oscillations. By a still further aspect of the invention, the second means includes means for limiting the magnitude of the oscillations in the stabilizing signal.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
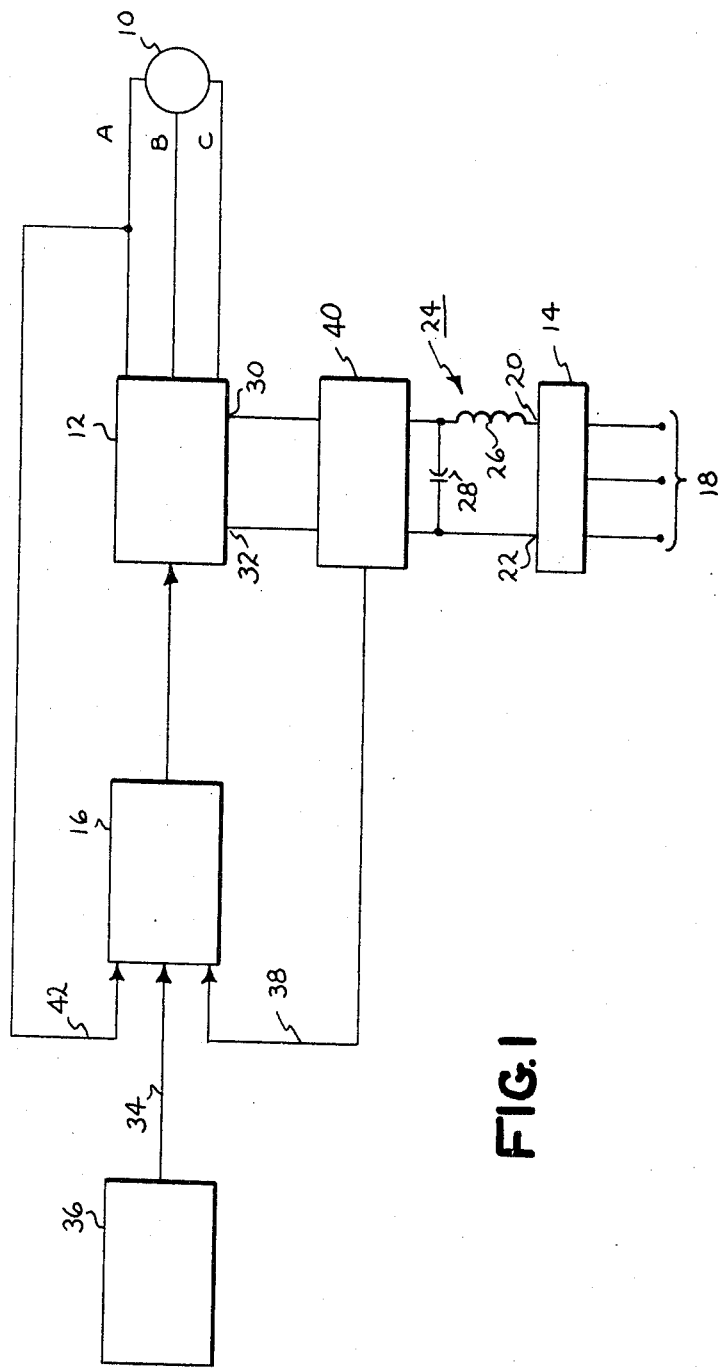
FIG. 1 is a block diagram of an a-c drive system including the stabilizing means of this invention.

Referring first to FIG. 1, an a-c motor drive system of the type disclosed by the aforesaid patent application Ser. No. 81,758 is illustrated in block diagram form. More particularly, the drive system as illustrated includes a three phase a-c reluctance-synchronous motor 10 supplied with variable frequency, variable voltage electric power from power conversion apparatus 12 over phase conductors A, B and C. The power conversion apparatus 12 comprises inverter circuitry of the pulse width modulated type for transforming direct current electric power from a d-c source 14 to polyphase variable frequency, variable voltage a-c electric power. As taught by the aforesaid patent application, the inverter circuitry of the power conversion equipment 12 includes gate controlled rectifying devices such as silicon controlled rectifiers (SCR's) or gaseous thyratrons which conduct in a predetermined sequence and for time periods determined by gate firing pulses supplied to the controlled rectifiers from a control apparatus 16. A clear understanding of the basic principles of operation of the inverter circuitry and its control apparatus 16 may be obtained from the aforesaid patent application.

Figure 2:
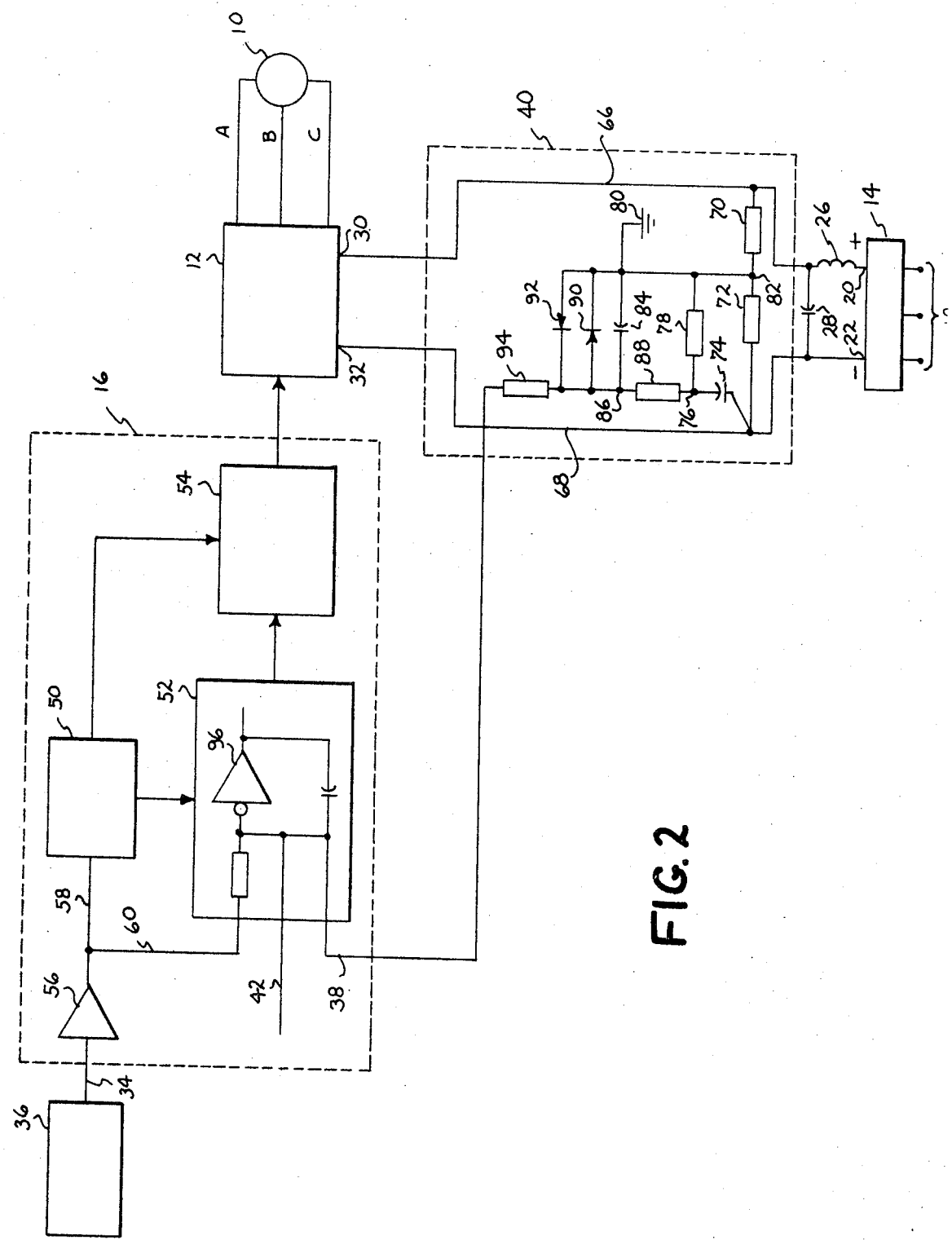
FIG. 2 is a more detailed diagram of a portion of the a-c drive system of FIG. 1 in which the stabilizing means is shown connected to the voltage control apparatus.
Figure 3:
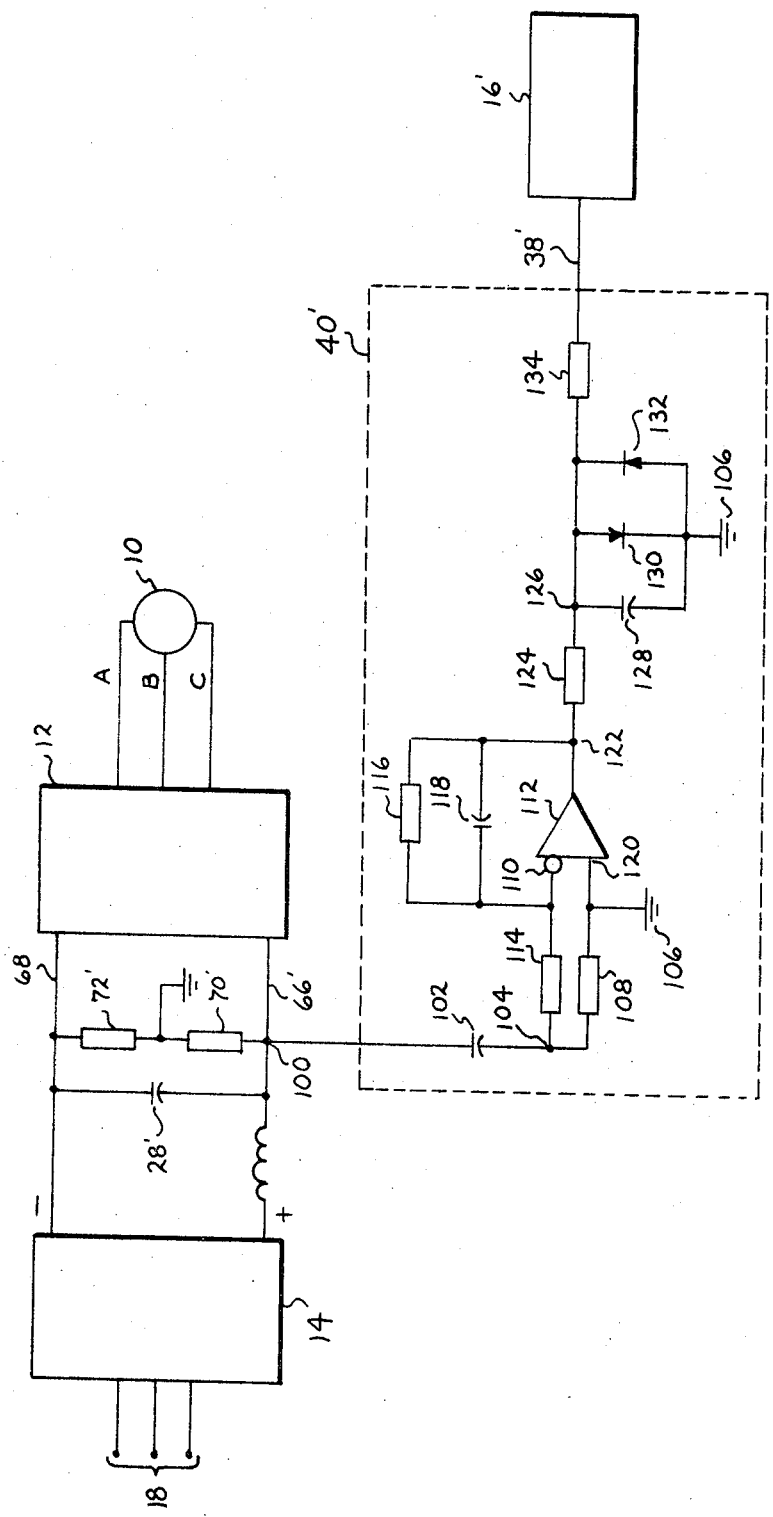
FIG. 3 is a view of a second embodiment of the stabilizing means.

The d-c power supply 14 is conveniently energized from a commercially available source 18 of three-phase alternating current electric potential and preferably includes full wave rectifying apparatus for providing a pulsating d-c potential between its output terminals 20 and 22 that is filtered or smoothed by a suitable filter network 24 including a series connected inductor 26 and a large filter capacitor 28. As illustrated by FIGS. 2 and 3, the capacitor 28 is connected across the pair of input terminals 30 and 32 of the inverter 12.

Referring now to FIG. 1, the control apparatus 16 produces firing pulses in the prescribed sequence at a rate determined by the magnitude and polarity of various input signals which include a reference signal on conductor 34 from a source 36 indicating a desired motor speed and, in accordance with the present invention, a stabilizing signal on conductor 38 generated by stabilizing means 40 when the speed of the motor 10 is oscillating about the speed called for by the reference signal. In practice, the control apparatus 16 is also supplied with one or more feedback signals such as a voltage feedback signal on conductor 42. The basic function of the control apparatus 16 is to produce, in response to the reference signal from the source 36, the stabilizing signal on conductor 38 produced in accordance with this invention, and the other input signals, firing signals for delivery to the SCR's of the pulse width modulated inverter 12 at fundamental and chopping rates to control the frequency and voltage of the output power from the inverter 12 such that the motor 10 operates at the steady state speed called for by the reference signal.

Before turning attention to the stabilizing means of the present invention, the control apparatus 16 will be considered in greater detail with references to the schematic diagram of FIG. 2. The control apparatus 16 responds to the command signal from the source 36, the stabilizing signal from the stabilizing means 40, and other input signals to determine the fundamental frequency of the alternating current electric power which is supplied to the motor 10, the time-ratio-controlled switching or chopping frequency, and the ratio of the "on" and "off" times for time-ratio-controlled regulation of the output voltage level. The output frequency and the chopping frequency of the inverter are determined by a frequency generator 50. A time-ratio-control regulating circuit 52 determines the output voltage level of the inverter circuit by determining the relative "on" and "off" times of the load-current carrying controlled rectifiers. A firing control circuit 54 responds to both the frequency generator 50 and to the voltage regulating circuit 52 to fire the SCR's of the inverter circuit 12 in accordance with the outputs of the frequency generator 50 and the voltage regulating circuit 52.

The command signal on conductor 34 can be obtained from any source 36 which is convenient for indicating a desired speed for the motor 10 and is coupled through a command amplifier 56 to conductors 58 and 60 which lead to the frequency generator 50 and the voltage regulating circuit 52, respectively. The output of the command amplifier 56 may be affected not only by the command signal 34, but also by various other signals.

The general mode of operation of the control apparatus 16 and its component portions 50, 52, 54 and 56 will be described hereinafter to the extent necessary for a clear and complete understanding of the present invention. If for any reason a more detailed description of the component portions and their modes of operation is desired, the aforesaid patent application Ser. No. 81,758 provides such a description. From the description of patent application Ser. No. 81,758, it will be seen that the voltage regulating circuit 52 includes an amplifier 96.

In a-c adjustable speed drive systems of the general type illustrated by FIG. 1, motor speed oscillations about the speed called for by the command signal from the reference source 36 are readily apparent from a number of the electrical parameters of the system. For example, the hunting frequency can be observed as a distortion of the motor current wave shape, as an oscillation of the motor shaft, or as a ripple current in the d-c link between the d-c source 14 and the inverter 12. It has heretofore occurred to those skilled in the art that it might be feasible to sense some quantity which varies in response to variations in motor speed and to use this quantity in a feedback circuit as a stabilizing signal. It has been found in accordance with the present invention that a particularly sensitive indicator of motor instability is the d-c voltage across the large capacitor 28 and the input terminals 30 and 32. Since the d-c voltage is across a large capacitance, it does not contain the high frequency components present in the motor or d-c link currents. It has been found in practice that motor speed instability appears to exhibit itself as an interchange of energy between the inertia of the motor 10 and the filter capacitance. Accordingly, the oscillations in the charge on the capacitor 28 are directly proportional to the speed oscillations of the motor 10. Therefore, a signal having oscillations therein in phase with and proportional to the voltage oscillations across the terminals 30 and 32 will be proportional to the motor speed oscillations, but phase shifted relative to the motor speed oscillations by approximately 180 degrees. In accordance with the present invention, means are provided for sensing oscillations in the d-c voltage across terminals 30 and 32, and corresponding oscillations in motor speed, and producing a first signal proportional to and in phase with the voltage oscillations. Means are provided for producing a stabilizing signal related to, but phase-shifted from, the first signal and for supplying the stabilizing signal to the control apparatus 16 as a control signal. The stabilizing apparatus of the present invention will now be described with reference to FIGS. 2 through 4.

Referring now to FIG. 2, a first embodiment of the stabilizing apparatus 40 will be described. As illustrated, the output terminal 20 of the d-c source 14 is connected through filter inductor 26 and conductor 66 to the input terminal 30 of the inverter 12. Output terminal 22 of the d-c source 14 is connected to the input terminal 32 of the inverter 12 by conductor 68. The large filter capacitor 28 is thus connected across the terminals 30 and 32. Oscillations in the d-c voltage across the terminals 30 and 32 can be sensed by sensing oscillations in the charge on the capacitor 28.

The stabilizing apparatus 40 includes means for sensing oscillations in motor speed as represented by oscillations in the charge on the capacitor 28. This means includes a voltage divider comprising identical resistors 70 and 72 connected across conductors 66 and 68, the junction 82 between the resistors 70 and 72 establishing the potential of common 80. A capacitor 74 is connected between conductor 68 and junction 76, and a resistor 78 is connected between junction 76 and common 80. With capacitor 74 filtering out the d-c component of charge on the capacitor 28, a signal is present at junction 76 which is porportional to and in phase with the magnitude of the oscillations in the voltage across the large capacitor 28 and the input terminals 30 and 32.

The stabilizing apparatus 40 also includes a phase shifting network responsive to the signal at junction 76 for producing a stabilizing signal having oscillations therein related to, but phase shifted, relative to the signal at junction 76 and to the oscillations in the d-c voltage. In the embodiment of FIG. 2, this means includes a capacitor 84 connected between junction 86 and common 80, a resistor 88 being provided between junctions 76 and 86. A pair of reversely poled diodes 90 and 92 are connected between junction 86 and common 80, and a gain setting resistor 94 is coupled between junction 86 and conductor 38. This network supplies to the conductor 38 a stabilizing signal having oscillations therein related to the oscillations in the signal at junction 76, but phase shifted by approximately 90 degrees. The diodes 90 and 92 limit the amplitude of the oscillations in the stabilizing signal. So long as the motor speed oscillations are not sufficiently large to cause the oscillations of the stabilizing signal to exceed the limits imposed by diodes 90 and 92, the stabilizing signal supplied to the conductor 38 will not only be phase shifted by approxi-mately 90 degrees relative to the signal at junction 76, but also will have oscillations therein proportional to the respective motor speed and d-c voltage oscillations.

As indicated previously, the conductor 38 supplies the stabilizing signal to the control apparatus 16. More particularly, the stabilizing signal is supplied along with the voltage feedback signal 42 and the signal on conductor 60 from the command amplifier 56 to the amplifier 96 of the voltage regulator 52. The amplifier 96 is of the integrating type and therefore produces a further 90 degree phase shift in the stabilizing signal, the total phase shift of the output signal from the amplifier 96 relative to the signal at junction 76 being approximately 180 degrees. This phase shift is sufficient to cause oscillations in the output voltage of the inverter 12 to occur approximately 180 degrees out-of-phase with respect to the oscillations in the d-c voltage across the capacitor 28 and the terminals 30 and 32 and therefore to be approximately in phase with the motor speed oscillations. It has been found that motor speed oscillations can be effectively damped by varying the output voltage of the inverter 12 in this manner. It is essential that the stabilizing signal supplied on conductor 38 to the amplifier 96 have a time varying polarity such that an increase in motor speed is accompanied by a corresponding increase in output voltage of the inverter 12 and such that a decrease in motor speed is accompanied by an in-phase decrease in inverter output voltage. This can be accomplished by causing oscillations in the output voltage to occur approximately 180 degrees out-of-phase relative to the signal at junction 76. To assure that an increase in motor speed is accompanied by an increase in output voltage and that a decrease in motor speed is accompanied by a decrease in output voltage, it may be necessary in actual drive systems to utilize inverting elements for assuring that the stabilizing signal on conductor 38 has the proper polarity at all times.

In one embodiment of the stabilizing arrangement of FIG. 2, the elements comprising the stabilizing means and the capacitor 28 were selected as follows: capacitor 28 - 4,000 micro-farads; resistors 70 and 72 - 1,000 ohms; capacitor 74 - 10 micro-farads; resistor 78 - 100,000 ohms; resistor 88 - 47,000 ohms; capacitor 84 - 1 micro-farad; diodes - 1N4148; resistor 94 - 47,000 ohms. This stabilizing network was utilized in connection with a d-c source 14 in which the nominal voltage output was 300 volts.

The voltage control means of the control apparatus 16 may not always include an integrating amplifier of the type illustrated by FIG. 2 for producing an additional 90 degree phase shift. Referring now to FIG. 3, an alternative embodiment 40' of the stabilizing means is illustrated, the stabilizing apparatus 40' producing a phase shift of approximately 150 degrees, thereby being effective for use with control apparatus 16' in which an additional phase shift of only approximately 30 degrees is produced. As illustrated, the potential of common 106 is established by a pair of resistors 70' and 72' across the capacitor 28', and the voltage across the capacitor 28' is sensed at junction 100. A signal proportional to the charge is supplied to capacitor 102 which filters out the d-c component and supplies to junction 104 a signal having oscillations proportional to the oscillations in the charge on the capacitor 28' and the oscillations in the motor speed. Junction 104 is connected to common 106 through resistor 108 and to an inverting input 110 of amplifier 112 through resistor 114. A gain setting resistor 116 and a capacitor 118 are connected across input 110 and output 122 of the amplifier 112, and input 120 of the amplifier 112 is connected to common 106. The a-c signal supplied to junction 104 is phase shifted in the amplifier 112 by approximately 60 degrees where the elements are selected as follows: capacitor 102 - 1 micro-farad; amplifier 112 - A741; capacitor 118 - 0.22 micro-farad; resistor 108 - 100,000 ohms; resistor 114 - 47,000 ohms; and resistor 116 - 470,000 ohms. From the output 122, the initially phase shifted signal is subjected to additional phase shifting and magnitude limiting by a network comprising a resistor 124 connected between amplifier output 122 and junction 126, a capacitor 128 connected between junction 126 and common 106, a pair of reversely poled diodes 130 and 132 connected between junction 126 and common 106, and a resistor 134 connected between junction 126 and conductor 38' for supplying the stabilizing signal to the control apparatus 16'. The signal supplied to output terminal 122 of the amplifier 112 is subjected to an additional phase shift of approximately 90 degrees where the elements are selected as follows: resistor 124 - 15,000 ohms; capacitor 128 - 3 micro-farads; diodes 130 and 132 - 1N4148;

and resistor 134 - 15,000 micro-farads. At this point, it will occur to those skilled in the art that other stabilizing networks could be readily supplied for producing a required phase shift. In accordance with the invention, it is necessary that the total phase shift produced by the stabilizing means and the inverter control apparatus be approximately 180 degrees. Where this occurs, the output voltage of the inverter 12 will increase in-phase with increasing motor speed and decrease in-phase with decreasing motor speed.

Figure 4:
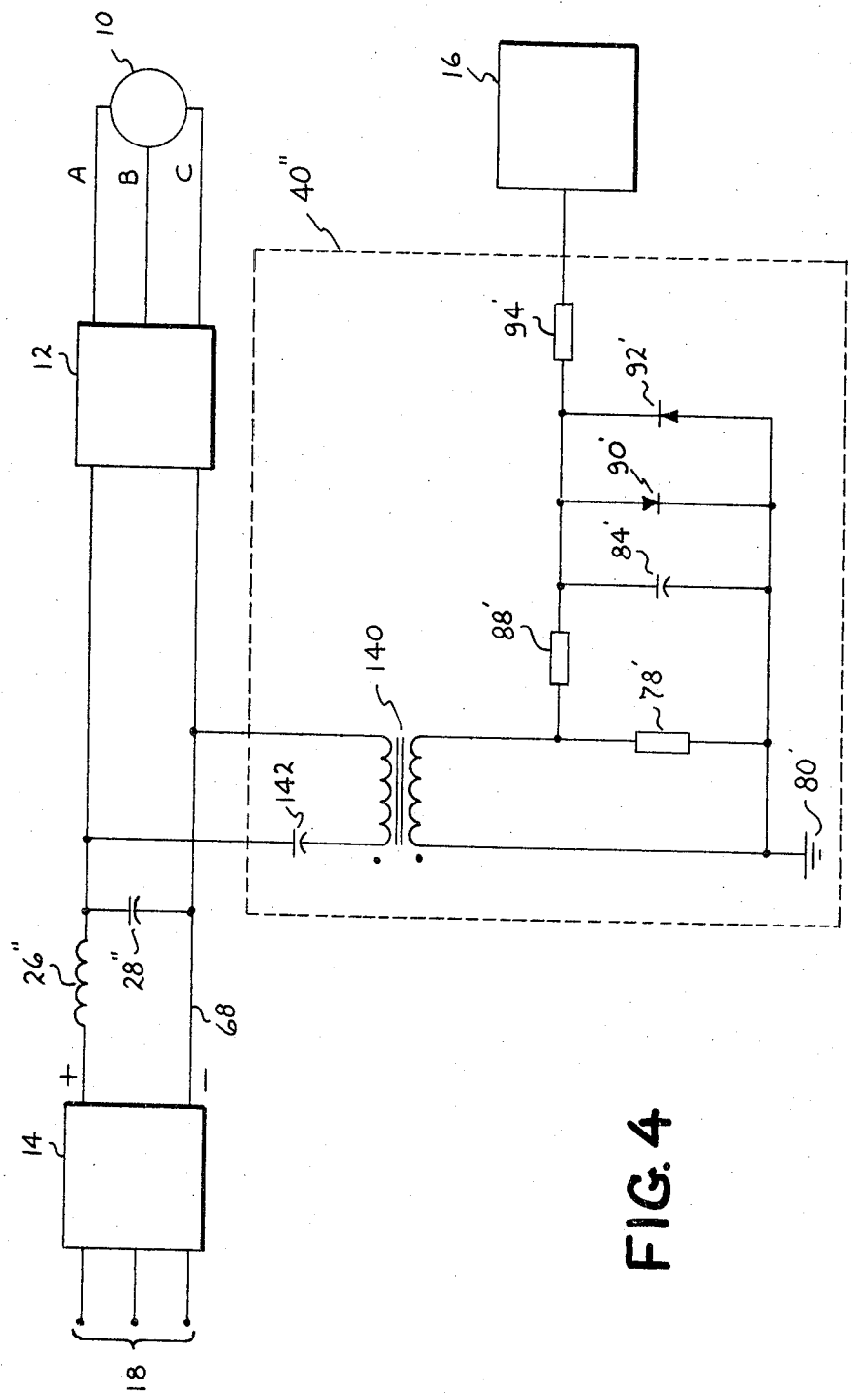
FIG. 4 is a view of a third embodiment of the stabilizing means.

A third embodiment 40" of the stabilizing means is illustrated by FIG. 4. As the stabilizing apparatus 40 of FIG. 2, the stabilizing apparatus 40" produces a stabilizing signal for delivery to the control apparatus 16 that is phase shifted approximately 90 degrees. The actual phase shifting network of FIG. 4 is identical to that of FIG. 2, and similar elements are indicated by primed numerals. The stabilizing means of FIG. 4 differs from that of FIG. 2, however, in that the signal supplied to resistor 88', which has oscillations proportional to the oscillations in the charge on the capacitor 28" and oscillations in the motor speed, is supplied through an isolation transformer 140, the primary winding of which is connected through a capacitor 142 across the large filter capacitor 28". The capacitor 142 blocks the d-c components of the charge on the capacitor 28" in the same manner as the capacitor 74 of FIG. 2.

From the foregoing, it will be seen that improved means have been provided for stabilizing operation of a-c motors utilized in a-c adjustable speed drive systems. Furthermore, it will be seen that the embodiments of the stabilizing means taught herein are relatively simple.

While the invention has been particularly shown and described with reference to preferred embodiments thereof, it will be understood by those skilled in the art that various changes in form, details, and application may be made therein without departing from the spirit and scope of the invention. Furthermore, although the invention has been illustrated in a polyphase drive system, it is equally applicable to single phase systems. Similarly, while the invention has been illustrated in a drive system including a single a-c motor 10, the invention is applicable to drive systems incorporating multiple motors. Accordingly, it is intended that all such modifications and changes be included within the scope of the appended claims.

What is claimed as new and is desired to secure by Letters Patent of the United States is:

1. In an a-c adjustable speed motor drive system of the type comprising an a-c motor subject to oscillations about a steady state speed, a power converter adapted to change d-c power supplied to a pair of input terminals thereof into adjustable frequency and voltage a-c power for application to said a-c motor, said a-c power having oscillations occurring substantially in phase with oscillations in the speed of said a-c motor to dampen the oscillations of said a-c motor, capacitive means connected between said input terminals of said power converter for storing an oscillating charge representative of oscillations of said a-c motor as exhibited by an interchange of energy between said a-c motor and said capacitive means through said power converter, and control apparatus responsive to an input signal for controlling the frequency and the voltage of the a-c power produced by said power converter, the improvement comprising:

a. first means responsive to oscillations in the charge on said capacitive means for generating a first signal having oscillations therein proportional to and in phase with the oscillations in the charge across said capacitive means; and b. second means responsive to the oscillations in said first signal to generate a stabilizing signal shifted in phase with respect to said first signal, said second signal forming said input signal to said control apparatus to effect an adjustment in the oscillations of the a-c power provided to said a-c motor which are substantially in phase with oscillations in the speed of said a-c motor.

2. The invention as recited in claim 1 wherein said second means comprises a phase shifting network for generating said stabilizing signal and said control apparatus includes a voltage control means responsive to said stabilizing signal for further phase shifting said stabilizing signal relative to said first signal by an amount sufficient to cause oscillations in the a-c power from said power converter to occur substantially in phase with oscillations in the speed of said a-c motor.

3. The invention as recited in claim 1 wherein said stabilizing signal generated by said second means varies in polarity in time with oscillations in the speed of said a-c motor while said a-c motor is running at various speeds under various load conditions such that the time varying polarity of said stabilizing signal effects an in-phase increase of the a-c power out of said power converter with an increase in the speed of said a-c motor, and an in-phase decrease of the a-c power out of said power converter with a decrease in the speed of said a-c motor.

4. The invention as recited in claim 2 wherein said second means further comprises means for limiting the amplitude of oscillations in said stabilizing signal.

5. Stabilizing means for damping motor speed oscillations in an a-c adjustable speed motor drive system comprising an a-c motor subject to oscillations about a steady state speed, a power converter adapted to change d-c power supplied to a pair of input terminals thereof into adjustable frequency and voltage a-c power for application to said a-c motor, said a-c power having oscillations occurring substantially in phase with oscillations in the speed of said a-c motor to dampen the oscillations of said a-c motor, capacitive means connected between said input terminals of said power converter for storing an oscillating charge representative of oscillations of said a-c motor as exhibited by an interchange of energy between said a-c motor and said capacitive means through said power converter, and control apparatus responsive to an input signal for controlling the frequency and the voltage of the a-c power produced by said power converter, said stabilizing means comprising:

a. sensing means including, a voltage divider connected between said input terminals of said power converter and having a junction for establishing a common potential for said stabilizing means, a first capacitor having first and second terminals, said first terminal connected to a one of said input terminals of said power converter, said first capacitor serving to filter out the d-c component of the charge on said capacitive means and provide a signal at said second terminal of said first capacitor which is in phase with and proportional to the oscillations in the charge stored by said capacitive means, and a first resistor connected between said junction of said voltage divider and said second terminal of said first capacitor;

b. phase shifting network including, a second resistor having first and second terminals, said first terminal connected to said second terminal of said first capacitor, and a second capacitor connected between said junction of said voltage divider and said second terminal of said second resistor, said phase shifting network generating a stabilizing signal shifted in-phase in response to the oscillations in the signal at said second terminal of said first resistor; and c. means connecting said second terminal of said second resistor as an input to said control apparatus to provide said stabilizing signal thereto as said input signal to effect an adjustment in the oscillations of the a-c power provided to said a-c motor which are substantially in phase with oscillations in the speed of said a-c motor.

6. Stabilizing means as recited in claim 5 wherein said phase shifting network further comprises a pair of reversely poled diodes connected between said junction of said voltage divider and said second terminal of said second resistor, said diodes serving to limit the amplitude of the oscillations in said stabilizing signal.

* * * * *